US006835222B2

(12) United States Patent
Gammack

(10) Patent No.: US 6,835,222 B2
(45) Date of Patent: Dec. 28, 2004

(54) APPARATUS FOR SEPARATING PARTICLES FROM FLUID FLOW

(75) Inventor: Peter David Gammack, Bath (GB)

(73) Assignee: Dyson Limited, Wiltshire (GB)

( * ) Notice: Subject to any disclaimer, the term of this patent is extended or adjusted under 35 U.S.C. 154(b) by 101 days.

(21) Appl. No.: 10/239,426

(22) PCT Filed: Mar. 19, 2001

(86) PCT No.: PCT/GB01/01199

§ 371 (c)(1),
(2), (4) Date: Jan. 8, 2003

(87) PCT Pub. No.: WO01/74493

PCT Pub. Date: Oct. 11, 2001

(65) Prior Publication Data

US 2004/0088956 A1 May 13, 2004

(30) Foreign Application Priority Data

Mar. 31, 2000 (GB) ............................................ 0008016

(51) Int. Cl.$^{7}$ ................................................ B01D 45/12

(52) U.S. Cl. ............................. 55/345; 55/346; 55/349; 55/DIG. 3

(58) Field of Search .......................... 95/270, 271, 269; 55/337, 345, 346, 347, 348, 349, 459.1–459.5, DIG. 3; 15/353

(56) References Cited

U.S. PATENT DOCUMENTS

| | | | | | |
|---|---|---|---|---|---|
| 1,416,995 | A | * | 5/1922 | Stroud | 55/343 |
| 2,553,175 | A | | 5/1951 | Davenport et al. | |
| 3,425,192 | A | | 2/1969 | Davis | |
| 4,711,720 | A | | 12/1987 | Young | |
| 5,160,356 | A | | 11/1992 | Dyson | |
| 6,238,451 | B1 | * | 5/2001 | Conrad et al. | 55/323 |
| 6,344,064 | B1 | * | 2/2002 | Conrad | 55/337 |
| 6,482,252 | B1 | * | 11/2002 | Conrad et al. | 96/57 |
| D475,820 | S | * | 6/2003 | Dyson et al. | D32/22 |
| 6,582,489 | B2 | * | 6/2003 | Conrad | 55/337 |
| 6,607,572 | B2 | * | 8/2003 | Gammack et al. | 55/343 |
| 2002/0116907 | A1 | * | 8/2002 | Gammack et al. | 55/345 |

FOREIGN PATENT DOCUMENTS

| | | |
|---|---|---|
| EP | 0042723 | 6/1981 |
| GB | 926800 | 5/1963 |

* cited by examiner

*Primary Examiner*—Duane S. Smith
(74) *Attorney, Agent, or Firm*—Morrison & Foerster LLP

(57) ABSTRACT

Apparatus (10, 110, 210, 310) for separating particles from a fluid flow comprises an upstream cyclonic separator (12, 112, 212, 312) and a plurality of downstream cyclonic separators (26, 126, 226, 326) arranged in parallel with one another. Each of the downstream cyclonic separators (26, 126, 226, 326) projects, at least in part, into the interior of the upstream cyclonic separator (12, 112, 212, 312). This arrangement provides a compact and economic apparatus which is particularly suitable for applications such as vacuum cleaners.

8 Claims, 5 Drawing Sheets

APPARATUS FOR SEPARATING PARTICLES FROM FLUID FLOW

FIELD OF THE INVENTION

The present invention relates to apparatus for separating particles from a fluid flow. Particularly, but not exclusively, the invention relates to apparatus for separating particles, such as dirt and dust particles, from an airflow.

BACKGROUND OF THE INVENTION

It is well known to separate particles, such as dirt and dust particles, from a fluid flow using a cyclonic separator. Known cyclonic separators are used in vacuum cleaners, for example, and have been known to comprise a low efficiency cyclone for separating fluff and relatively large particles and a high efficiency cyclone located downstream of the low efficiency cyclone for separating the fine particles which remain entrained within the airflow (see, for example, EP 0 042 723B). It is also known to provide, in vacuum cleaning apparatus, an upstream cyclonic separator in combination with a plurality of smaller, downstream cyclonic separators, the downstream cyclonic separators being arranged in parallel wilt one another. An arrangement of this type is shown and described in U.S. Pat. No. 3,425,192 to Davis.

SUMMARY OF THE INVENTION

In vacuum cleaner applications, particularly in domestic vacuum cleaner applications, it is desirable for the appliance to be made as compact as possible without compromising the performance of the appliance. It is also desirable for the efficiency of the separation apparatus contained within the appliance to be as efficient as possible (ie. to separate as high a proportion as possible of very fine dust particles from the airflow). It is therefore an object of the present invention to provide improved apparatus for separating particles from a fluid flow. It is a further object of the present invention to provide apparatus for separating particles from a fluid flow having an improved separation efficiency or pressure drop and having a compact arrangement. It is a further object of the invention to provide improved apparatus for separating particles from a fluid flow and suitable for use in a domestic vacuum cleaner.

The invention provides apparatus for separating particles from a fluid flow comprising an upstream cyclonic separator and a plurality of downstream cyclonic separators arranged in parallel with one another, characterised in that each of the downstream cyclonic separators projects, at least in part, into the interior of the upstream cyclonic separator.

The arrangement of the invention makes use of the high separation efficiency achievable by a plurality of parallel cyclones whilst also allowing the combination of the upstream and downstream cyclonic separators to be compactly packaged. This allows the apparatus to be utilised in an appliance such as a domestic vacuum cleaner.

Preferably, each of the downstream cyclonic separators projects into the interior of the upstream cyclonic separator by a distance equal to at least one third of the length of the respective downstream cyclonic separator. More preferably, each of the downstream cyclonic separators projects into the interior of the upstream cyclonic separator by a distance equal to at least half of the length of the respective downstream cyclonic separator. Still more preferably, each of the downstream cyclonic separators projects into the interior of the upstream cyclonic separator by a distance equal to at least two thirds of the length of the respective downstream cyclonic separator. In a preferred embodiment, that each of the downstream cyclonic separators is located substantially wholly within the upstream cyclonic separator. These arrangements give rise to convenient and compact packaging solutions.

BRIEF DESCRIPTION OF THE DRAWINGS

Embodiments of the invention will now be described with reference to the accompanying drawings, wherein.

DETAILED DESCRIPTION OF THE INVENTION

Figure 1:
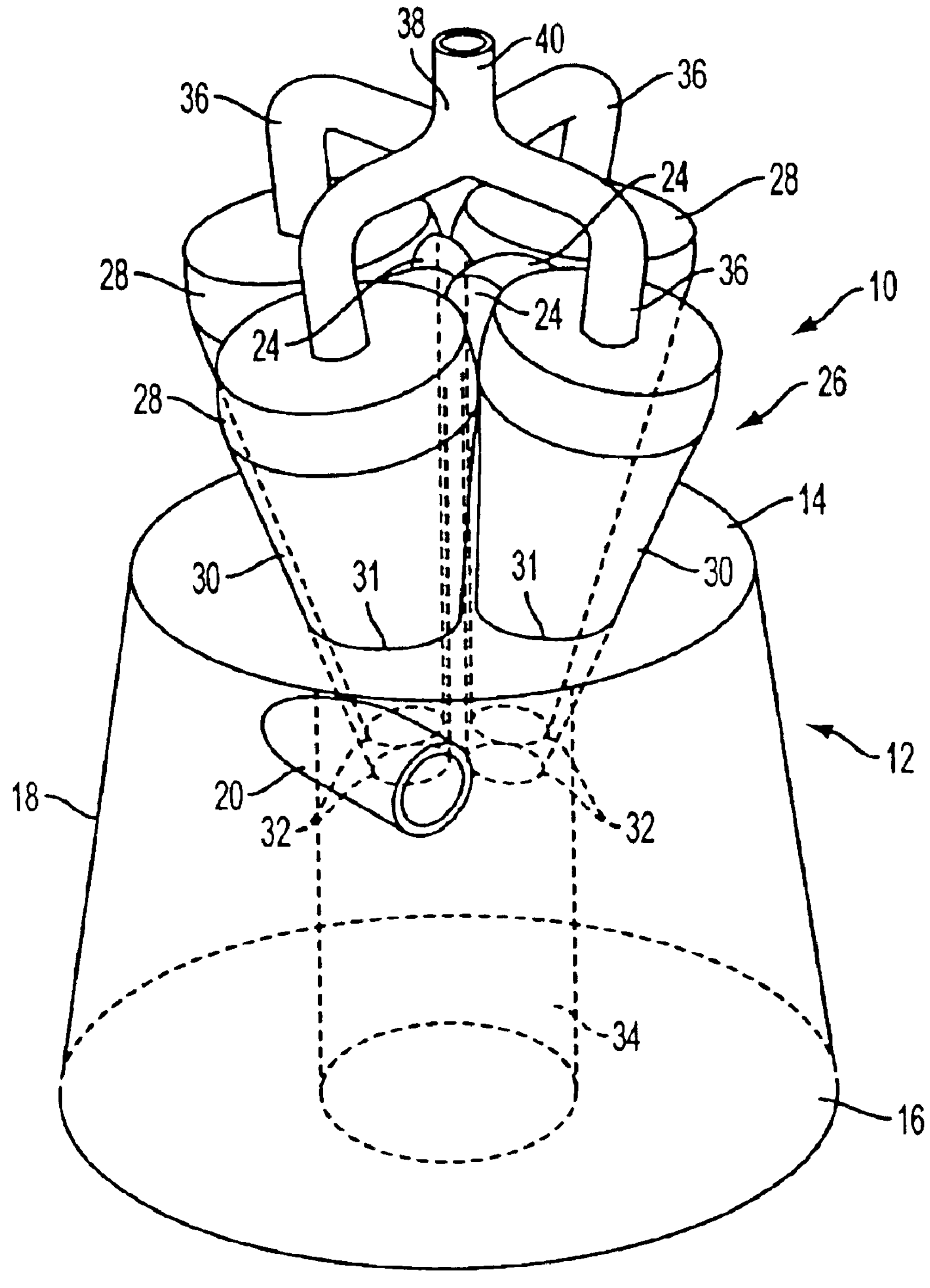
FIG. 1 is a schematic perspective view of apparatus according to a first embodiment of the present invention.

The basic principle of the present invention is illustrated in FIG. 1. In FIG. 1, the apparatus 10 for separating particles from a fluid flow comprises an upstream cyclone 12 having an upper end 14 and a base 16. A side wall 18 extends between the upper end 14 and the base 16. The side wall 18 is frusto-conical so that the upstream cyclone 12 tapers outwardly away from the upper end 14. A tangential inlet 20 is provided in the side wall 18 adjacent the upper end 14. The tangential inlet 20 is capable of delivering particle-laden fluid to the interior of the upstream cyclone 12 in a direction which is tangential to the side wall 18 so as to set up a swirling flow in the interior of the upstream cyclone 12. In many of the applications for which the apparatus 10 is intended to be used, the fluid is air and the particles are dirt and dust such as will be found in a domestic environment.

The upstream cyclone 12 has an outlet (not shown) which is located centrally of the upper end 14 and communicates with the interior of the upstream cyclone 12. The outlet comprises a generally cylindrical pipe which extends vertically upwardly from the upper end 14 of the upstream cyclone 12. The outlet divides into four inlet conduits 24 in a symmetrical and even manner. Each inlet conduit 24 is dimensioned and arranged so as to receive one quarter of any fluid flow traveling along the outlet from the upstream cyclone 12.

Each inlet conduit 24 communicates with a downstream cyclone 26. Each downstream cyclone 26 has an upper cylindrical portion 28 with which the respective inlet conduit 24 communicates in a tangential manner. A frusto-conical cyclone portion 30 depends from each upper cylindrical portion 28 and has an open cone opening 32 remote therefrom. Each downstream cyclone 26 has a longitudinal axis (not shown) about which the respective upper cylindrical portion 28 and frusto-conical cyclone portion 30 are arranged. The four downstream cyclones 26 are inclined to the vertical so that their longitudinal axes approach one another in a downward direction. The cone openings 32 are therefore arranged close to one another and symmetrically about a longitudinal axis of the upstream cyclone 12.

Each of the frusto-conical cyclone portions 30 passes through the upper end 14 of the upstream cyclone 12. In the upper end 14, four appropriately-sized apertures 31 are arranged. Each of the frusto-conical cyclone portions 30 is fixed to the rim of the respective aperture 31 in a manner which maintains a seal therebetween.

A cylindrical collector 34 is arranged inside the upstream cyclone 12. The cylindrical collector 34 extends between the base 16 of the upstream cyclone 12 and meets the frusto-conical cyclone portions. 30 of the downstream cyclones 26 at a location which is slightly above the cone openings 32. Although it is not shown in FIG. 1, the cylindrical collector 34 has an upper face through which the lower ends of the frustoconical cyclone portions 30 pass in such a manner as to seal the interior of the cylindrical collector 34 from the remainder of the interior of the upstream cyclone 12.

Each of the four downstream cyclones 26 has an outlet conduit 36 located centrally of the respective upper cylindrical portion 28. The outlet conduits 36 meet at a junction 38 to form a combined outlet 40. Fluid entering the apparatus 10 via the tangential inlet 20 is expelled via the combined outlet 40. In some applications, for example in vacuum cleaner applications, the combined outlet 40 will be connected in a known manner to a vacuum source.

The apparatus 10 described above operates in the following manner. A fluid flow in which particles are entrained enters the apparatus 10 via the tangential inlet 20. The orientation of the tangential inlet 20 causes the fluid flow to follow a helical path within the upstream cyclone 12 so that the fluid flow travels downwardly towards the base 16. Relatively large particles entrained within the incoming fluid flow are deposited in the lower portion of the interior of the upstream cyclone 12 adjacent the base 16. The fluid flow, in which smaller particles remain entrained, moves inwardly and upwardly towards the upper end 14 of the upstream cyclone 12. The fluid flow exits the upstream cyclone 12 via the outlet (not shown) along which the fluid flow travels until it is split into four separate fluid flows which travel along the inlet conduits 24 to the downstream cyclones 26. When each portion of the fluid flow reaches the upper cylindrical portion 28 of the respective downstream cyclone 26, it again follows a helical path therein in view of the tangential orientation of the inlet conduit 24. The fluid flow then follows a further helical path down the frusto-conical cyclone portion 30 of the downstream cyclone 26 and, during this time, many of the fine particles are separated from the fluid flow. The separated fine particles are deposited inside the cylindrical collector 34 whilst the particle-free fluid leaves the downstream cyclone 26 via the outlet conduit 36. The separate fluid flows are recombined at the junction 38 and leave the apparatus 10 via the combined outlet 40.

In this embodiment, the downstream cyclones 26 project into the interior of the upstream cyclone 12 to such an extent that approximately one third of the length of each downstream cyclone 26 is located inside the upstream cyclone 12. The arrangement is compact and efficient and therefore suitable for use in an application where dimensions are to be kept as small as possible. An example of such an application is a domestic vacuum cleaner in which considerations of size and weight are of considerable importance. In such an application, the combined outlet 40 will be connected to a vacuum source and the tangential inlet 20 will be connected to a dirty air inlet of the vacuum cleaner. In a cylinder vacuum cleaner, the dirty air inlet will take the form of a hose and wand assembly. In an upright vacuum cleaner, the dirty air inlet will take the form of a cleaner head forming part of the vacuum cleaner as a whole. Arrangements can, of course, be made within an upright vacuum cleaner for conversion to operation in a cylinder mode. The mode of operation of the vacuum cleaner has no effect on the apparatus illustrated above.

In all vacuum cleaner applications, the apparatus 10 described above will require periodic emptying of separated particles. One way to achieve this would be to arrange for the base 16 to be made removable from the side wall 18 for emptying purposes. In this case, it is specifically advantageous if the cylindrical collector 34 is formed primarily by way of a cylindrical wall which meets and abuts against the base 16. The interior of the cylindrical collector 34 is therefore delimited at the lower end by the base 16. This allows both the cylindrical collector 34 and the remainder of the upstream cyclone 12 to be emptied simultaneously. Alternatively, the upstream cyclone 12 can be made separable at a position between the upper end 14 and the base 16, preferably in the vicinity of the upper end 14. The point of separation is advantageously located so that the upper end 14 and a portion of the side wall 18 incorporating the tangential inlet 20, together with the downstream cyclones 26, are separable from the remainder of the side wall 18 together with the cylindrical collector 34.

Figure 2A:
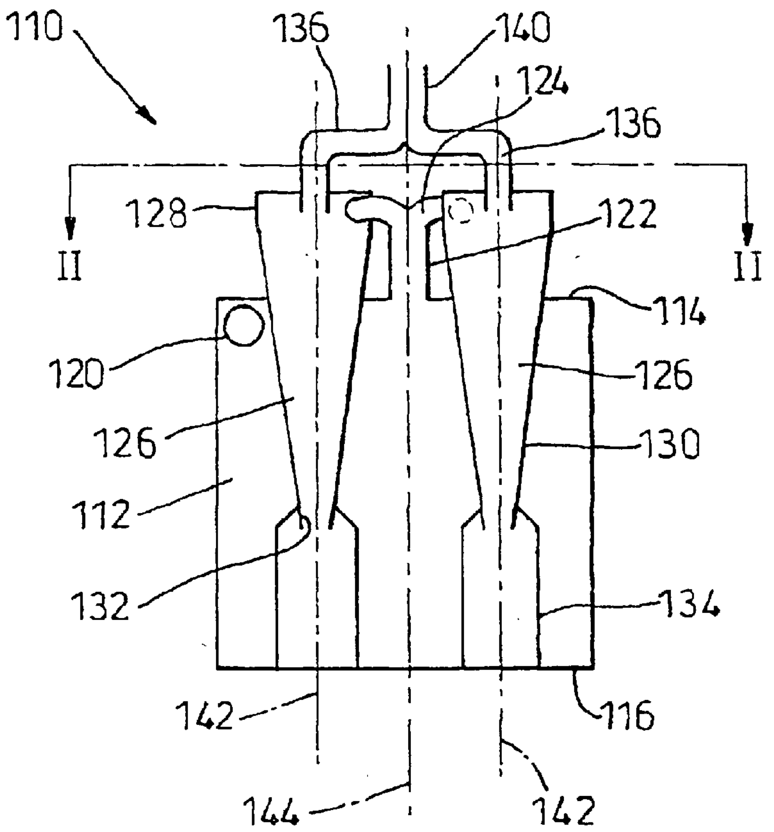
FIG. 2*a* is a longitudinal section through apparatus according to a second embodiment of the present invention.
Figure 2B:
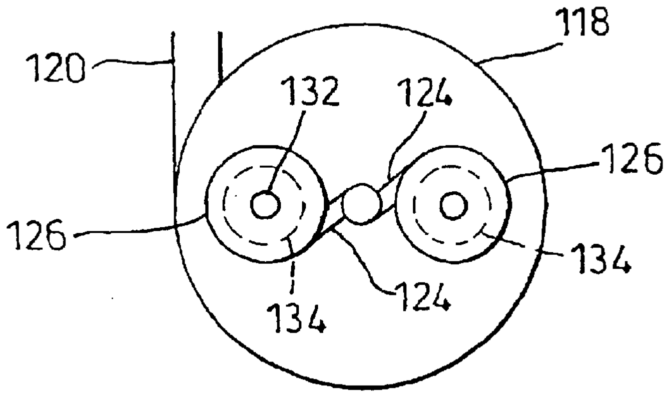
FIG. 2*b* is a sectional view taken along the line II—II of FIG. 2*a;*

A second embodiment of the invention is shown in FIGS. 2*a* and 2*b*. In this embodiment, the upstream cyclone 112 again has an upper end 114 and a base 116. The side wall 118 is cylindrical so that the overall shape of the upstream cyclone 112 is also cylindrical. A tangential inlet 120 is again provided adjacent the upper end 114 of the upstream cyclone 112.

In this second embodiment, only two downstream cyclones 126 are provided. Therefore, the outlet 122 from the upstream cyclone 112 is divided into only two separate inlet conduits 124. The inlet conduits 124 each communicate in a tangential manner with the upper cylindrical portion 128 of the respective downstream cyclone 126.

Figure 3A:
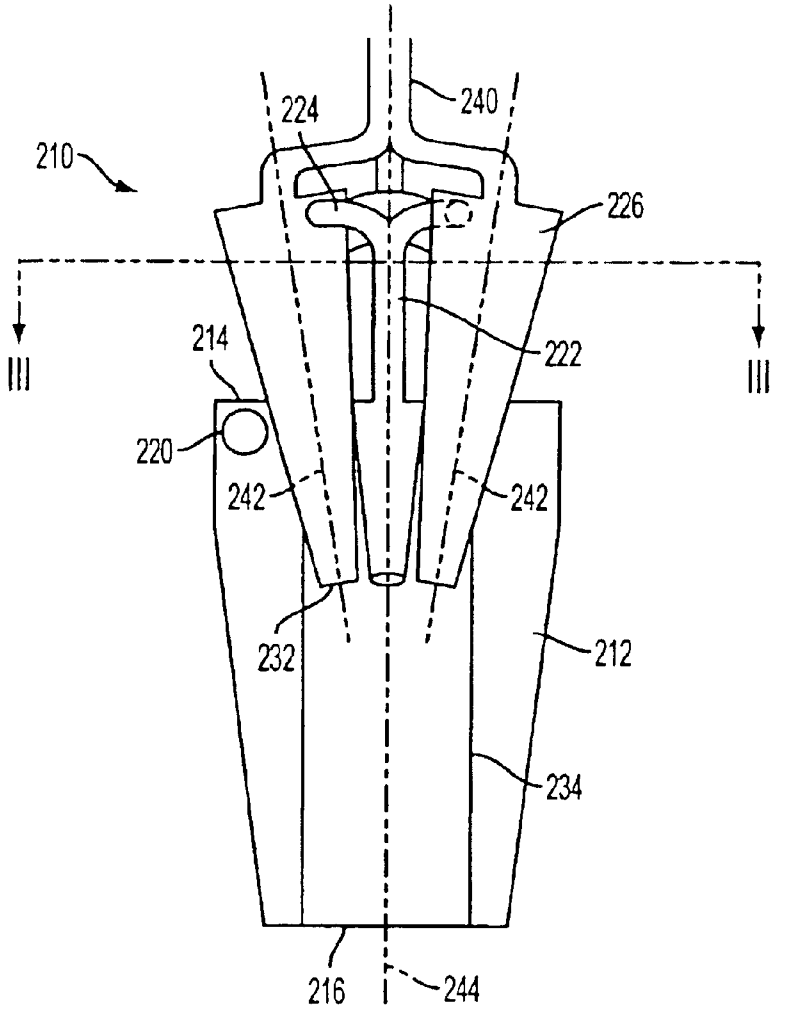
FIG. 3*a* is a longitudinal section taken through apparatus according to a third embodiment of the present invention.

The tangential input 220, the outlet 222, the inlet conduits 224, and the combined outlet 240 as shown in FIG. 3*a* are similar to the tangential input 120, the outlet 122, the inlet conduits 124, and the combined outlet 140 as shown in FIG. 2*a*, respectively.

In this embodiment, the longitudinal axis 142 of each downstream cyclone lies parallel to the longitudinal axis 144 of the upstream cyclone 122. Each downstream cyclone 126 has a generally cylindrical collector 134 depending from the frusto-conical cyclone portion 130. Each cylindrical collector 134 extends downwardly from the frusto-conical cyclone portion 130 just above the cone opening 132 to the base 116 of the upstream cyclone 112. Each downstream cyclone 126 also has an outlet conduit 136 which is located centrally of the respective upper cylindrical portion 128 and which merges with the other outlet conduits 136 to form a combined outlet 140.

The operation of the apparatus 110 illustrated in FIGS. 2*a* and 2*b* is similar to that of the apparatus 10 shown in FIG. 1. Fluid in which particles requiring separation are entrained enters the cyclone 112 via the tangential inlet 120. The fluid follows a helical path down the cylindrical side wall 118 of the upstream cyclone 112 and larger particles are deposited inside the upstream cyclone 112 adjacent the base 116. Partially cleaned fluid then leaves the upstream cyclone 112 via the outlet 122 and the fluid flow is then divided into two separate fluid flows. Each separate fluid flow is then conducted to a downstream cyclone 126 in which the fluid flow follows a helical path about the upper cylindrical portion 128 and the frusto-conical cyclone portion 130 during which time the fluid flow is accelerated to high angular velocities. In this way, fine particles are separated from the fluid flow and deposited in the cylindrical collectors 134. The cleaned fluid flow leaves the downstream cyclones 126 via the outlet conduits 136 and, subsequently, via the combined outlet 140.

As can be seen from FIG. 2*a*, the downstream cyclones 126 project into the upstream cyclone 112 through the upper end 114 thereof. The arrangement is such that the downstream cyclones 126 project into the upstream cyclone 112 to such an extent that approximately two thirds of the length of each downstream cyclone 126 is located in the interior of the upstream cyclone 112. This arrangement provides an extremely compact and useful arrangement in which the efficiency of the upstream cyclone 112 is not compromised to any significant extent. In other respects, the apparatus 110 is similar to the apparatus 10 shown in FIG. 1 and described above.

Figure 3B:
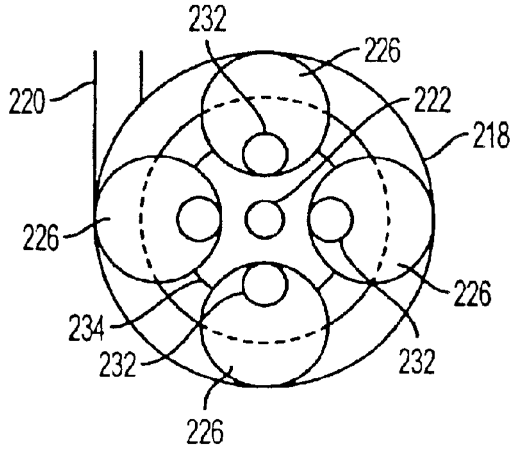
FIG. 3*b* is a section taken along the line III—III of FIG. 3*a;*

A third embodiment of the invention is shown in FIGS. 3*a* and 3*b*. In this embodiment, as in the embodiment shown in FIG. 1, the apparatus 210 comprises an upstream cyclone 212 and four downstream cyclones 226. Also, as shown in FIG. 1, the longitudinal axes 242 of the downstream cyclones 226 are inclined towards the longitudinal axis 244 of the upstream cyclone 212. A further similarity between the embodiment shown in FIG. 1 and that shown in FIGS. 3*a* and 3*b* is that all four of the downstream cyclones 226 have cone openings 232 which are surrounded and enclosed by a single cylindrical collector 234.

There are two major differences between the apparatus 10 shown in FIG. 1 and the apparatus 210 shown in FIGS. 3*a* and 3*b*. In the apparatus 210 shown in FIGS. 3*a* and 3*b*, the side wall 218 of the upstream cyclone 212 is frusto-conical and tapers inwardly from the upper end 214 towards the base 216. Thus, the interior of the upstream cyclone 212 has a generally inwardly-tapering configuration. The second difference between the apparatus 10 shown in FIG. 1 and the apparatus 210 shown in FIGS. 3*a* and 3*b* is that, in the apparatus 210 shown in FIGS. 3*a* and 3*b*, each downstream cyclone 226 projects into the interior of the upstream cyclone 212 to such an extent that approximately one half of each of the downstream cyclones 226 is located inside the upstream cyclone 212. This, in combination with the inwardly-tapering shape of the upstream cyclone 212 provides another compact and economical arrangement of the apparatus 210.

The operation of the apparatus 210 is similar to that of the apparatus previously described in detail.

Figure 4A:
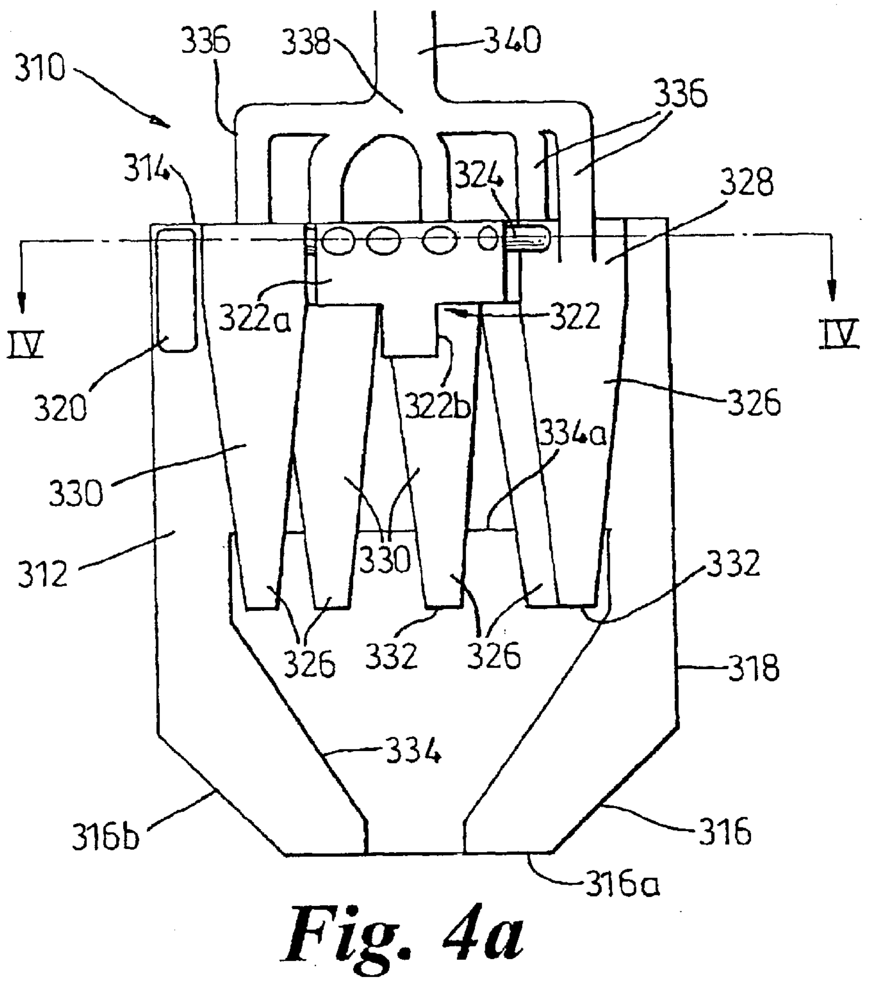
FIG. 4*a* is a longitudinal cross-section through apparatus according to a fourth embodiment of the present invention and taken along the line IV—IV of FIG. 4*b;*
Figure 4B:
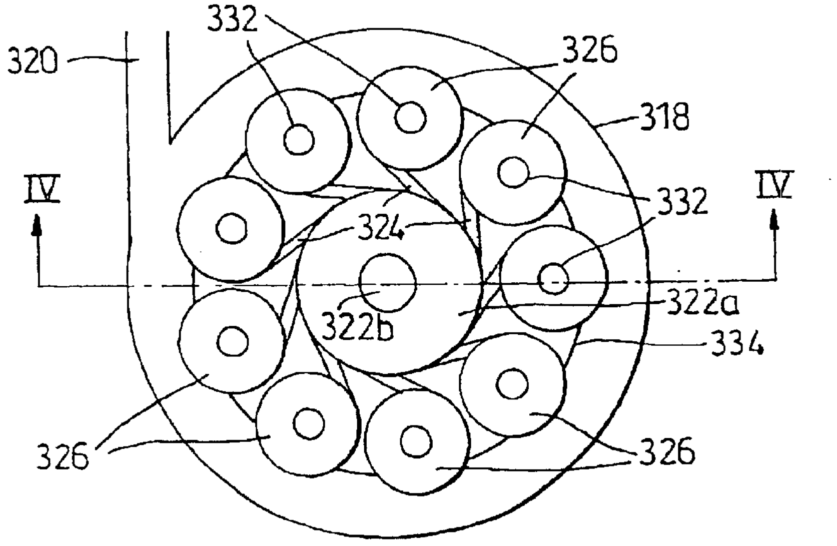
FIG. 4*b* is a transverse cross-section taken along the line IV—IV of FIG. 4*a;*

A fourth embodiment of apparatus according to the invention is illustrated in FIGS. 4*a* and 4*b*. In this embodiment, the apparatus 310 includes an upstream cyclone 312 having an upper end 314 and a base 316. The base 316 comprises a central circular portion 316*a* and a frusto-conical portion 316*b* extending upwardly away from the central circular portion 316*a*. A cylindrical side wall 318 extends between the frustoconical portion 316*b* of the base 316 and the upper end 314. The tangential inlet 320 has an elongated shape as shown in FIG. 4*a*.

The upstream cyclone 312 has an outlet 322 arranged centrally of the upper end 314. The outlet 322 comprises a cylindrical chamber 322*a* located immediately beneath the upper end 314 and centrally thereof. A depending tube 322*b* communicates with the chamber 322*a* and extends therefrom towards the base 316. The depending tube 322*b* is open at the lower end thereof so as to communicate with the interior of the upstream cyclone 312.

Nine downstream cyclones 326 are equispaced about the chamber 322*a* and immediately beneath the upper end 314 of the upstream cyclone 312. An inlet conduit 324 extends between the chamber 322*a* and the upper cylindrical portion 328 of each of the downstream cyclones 326. The upper cylindrical portion 328 of each of the downstream cyclones 326 is closed on the upper side thereof by the upper end 314 of the upstream cyclone 312. As in previous embodiments, each inlet conduit 324 communicates with the respective upper cylindrical portion 328 in such a manner that fluid entering each downstream cyclone 326 does so in a tangential manner. The upstream end of each inlet conduit 324 communicates with the chamber 322*a* so as to form a tangential offtake (see FIG. 4*b*).

Each downstream cyclone 326 has a frusto-conical cyclone portion 330 depending from the upper cylindrical portion 328 thereof At the lower end of each frusto-conical cyclone portion 330, a cone opening 332 is provided. A collector 334 surrounds and encloses all of the cone openings 332 so that all nine of the downstream cyclones 326 are able to deposit separated particles in the interior of the collector 334. The collector 334 is generally frusto-conical in shape and has an upper face 334*a* which is able to receive the lower ends of the frusto-conical cyclone portions 330 of the downstream cyclones 326 so that the frusto-conical cyclone portions 330 pass into the interior of the collector 334. The upper face 334*a* also serves to separate the interior of the collector 334 from the remainder of the interior of the upstream cyclone 312.

Each downstream cyclone 326 has an outlet conduit 336 arranged centrally of the upper cylindrical portion 328 thereof. Each outlet conduit 336 passes through the upper end 314 of the upstream cyclone 312. As in previous embodiments, the outlet conduits 336 merge at a junction 338 so as to form a combined outlet 340.

Operation of the apparatus 310 is similar to the apparatus previously described. Fluid in which particles are entrained enters the apparatus 310 via the tangential inlet 320. The fluid (and entrained particles) follow a general helical path around the interior of the upstream cyclone 312 and down the side wall 318 towards the base 316. Larger particles are separated from the fluid flow and collected in the interior of the upstream cyclone 312 between the frusto-conical walls of the collector 334 and the frusto-conical portion 316*b* of the base 316. The partially cleaned fluid flow moves inwardly and upwardly finding its way between the downstream cyclones 326 until it exits the upstream cyclone 312 via the depending tube 322*b* of the outlet 322. The fluid flow then enters the chamber 322*a*, still rotating to some extent about the longitudinal axis of the upstream cyclone 312, and is there divided into nine roughly equivalent fluid flows by way of the inlet conduits 324. Each individual fluid flow is then passed to the upper cylindrical portion 328 of one of the downstream cyclones 326. Inside the respective downstream cyclone 326, the fluid flow follows a generally helical path, increasing in angular velocity as it travels down the frusto-conical cyclone portion 330 towards the cone opening 332. Fine particles are separated from the fluid flow during this process and the particles are then deposited in the collector

334 whilst the cleaned fluid flow leaves the downstream cyclone 326 via the outlet conduit 336. The nine separate fluid flows are recombined at the junction 338 and leave the apparatus 310 via the combined outlet 340.

As can clearly be seen from FIG. 4*a*, each of the downstream cyclones 326 is located wholly within the upstream cyclone 312. This arrangement is particularly compact and useful in applications such as cylinder vacuum cleaners. Several features are particularly advantageous here: the inclusion of a frusto-conical portion of the base 316 allows the apparatus 310 as a whole to be inclined to the vertical without compromising the overall height of the apparatus unduly. Also, the frusto-conical shape of the collector 334 increases the volume of the portion of the interior of the upstream cyclone 312 in which large particles and debris are intended to collect. This means that, in a vacuum cleaner application, the apparatus 310 can be used for a significant period of time without requiring to be emptied.

As in previous embodiments, the apparatus 310 illustrated in FIGS. 4*a* and 4*b* can be emptied simply by removing a portion of the upstream cyclone 312 (advantageously the majority of the side wall 318 together with the collector 334) so that emptying can take place.

Figure 5A:
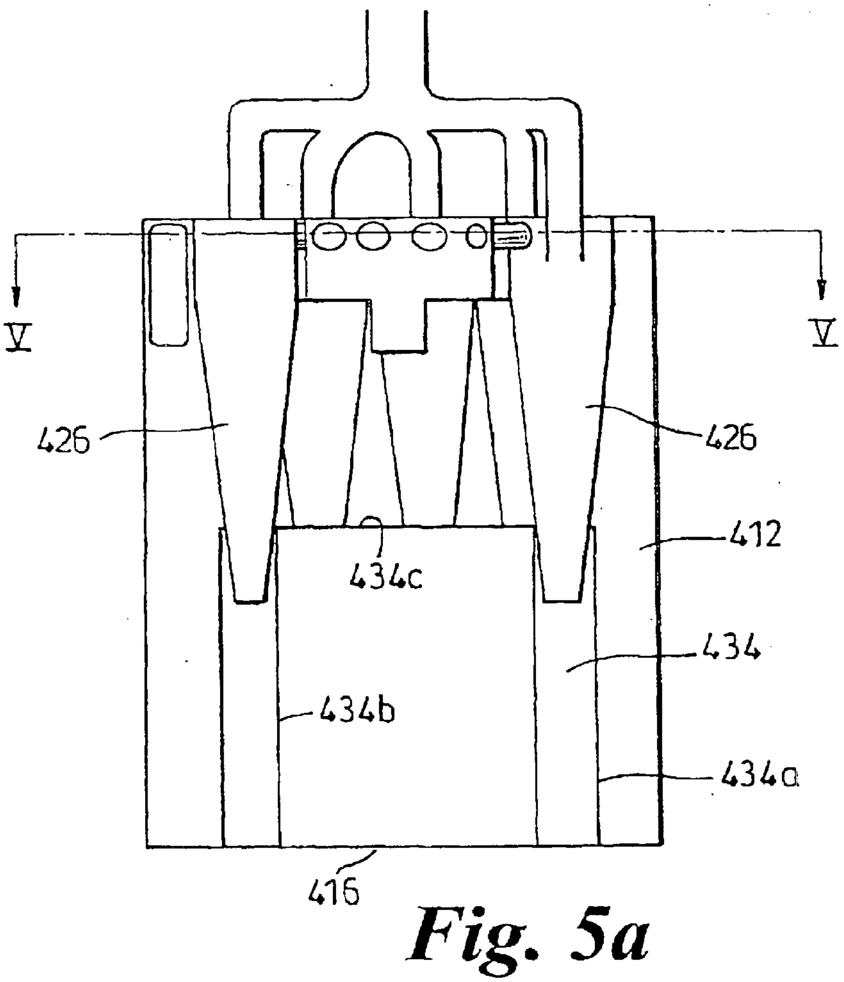
FIG. 5*a* is a longitudinal cross-section through apparatus according to a fifth embodiment of the present invention and taken along the line V—V of FIG. 5*b*.
Figure 5B:
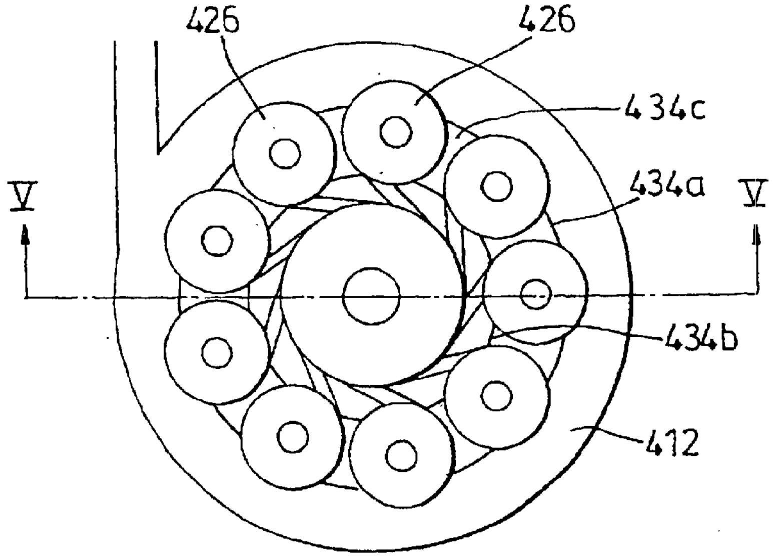
FIG. 5*b* is a transverse cross-section taken along the line V—V of FIG. 5*a.*

A fifth embodiment is illustrated in FIGS. 5*a* and 5*b*. It is very similar to the fourth embodiment illustrated in FIGS. 4*a* and 4*b* and described above. Indeed, the only difference between the fourth and fifth embodiments lies in the shape of the collector 434 in which particles separated in the downstream cyclones 426 are deposited. Whereas the collector 334 forming part of the fourth embodiment is generally conical in shape, the collector 434 forming part of the fifth embodiment is generally annular in shape. The collector 434 has an outer wall 434*a* and an inner wall 434*b* which extend upwardly from the base 416 of the upstream cyclone 412. The downstream cyclones 426 project into the annular space between the outer wall 434*a* and the inner wall 434*b* to a level below the uppermost edges of the outer and inner walls 434*a*, 434*b*. The container 434 is closed at the top between the downstream cyclones 426 by a lid portion 434*c* through which the downstream cyclones 426 are arranged to pass. Seals (not shown) are provided on the lid portion 434*c* to cooperate with the outer surfaces of the downstream cyclones 426 when the downstream cyclones 426 are located as shown in FIG. 5*a*. The apparatus operates in a manner very similar to that in which the apparatus of FIGS. 4*a* and 4*b* operates, save that the dirt and dust separated in the downstream cyclones 426 of FIGS. 5*a* and 5*b* is collected in the annular collector 434 instead of in the conical collector 334 of FIGS. 4*a* and 4*b*. When emptying of the container 434 is required, the downstream cyclones 426 are withdrawn from the interior of the container 434 and the upstream cyclone 412, together with the inner and outer walls 434*a*, 434*b*, is inverted to allow the accumulated dirt and dust to be disposed of in an appropriate fashion.

It will be appreciated from the foregoing description of the four illustrated embodiments that the invention is not limited by the shape of the upstream cyclone or the extent to which the downstream cyclones project into the interior thereof. Furthermore, any convenient manner of emptying the apparatus illustrated above can be employed. The skilled reader will also appreciate that the means by which the fluid flow is divided and recombined does not have a material effect on the fundamental aspects of the invention. Therefore, modifications and variations to these and other aspects of the embodiments illustrated are intended to fall within the scope of the claimed invention.

What is claimed is:

1. A domestic vacuum cleaner incorporating apparatus for separating dirt and dust particles from an airflow, comprising an upstream cyclonic separator and a plurality of downstream cyclonic separators arranged in parallel with one another, each of the downstream cyclonic separators projecting at least partially into an interior portion of the upstream cyclonic separator.

2. A domestic vacuum cleaner as claimed in claim 1, wherein the upstream cyclonic separator comprises a generally cylindrical chamber having a tangential or scroll entry.

3. A domestic vacuum cleaner as claimed in claim 1, wherein the upstream cyclonic separator comprises a chamber having a tangential or scroll entry and that tapers outwardly from the entry.

4. A domestic vacuum cleaner as claimed in claim 1, wherein the upstream cyclonic separator comprises a chamber having a tangential or scroll entry and that tapers inwardly from the entry.

5. A domestic vacuum cleaner as claimed in claim 1, 2, 3 or 4, wherein each of the downstream cyclonic separators comprises a frusto-conical cyclone.

6. A domestic vacuum cleaner as claimed in claim 1, 2, 3 or 4, wherein each of the downstream cyclonic separators projects into the interior portion of the upstream cyclonic separator by a distance equal to about one third of its length.

7. A domestic vacuum cleaner as claimed in claim 1, 2, 3 or 4, wherein each of the downstream cyclonic separators projects into the interior portion of the upstream cyclonic separator by a distance equal to about half of its length.

8. A domestic vacuum cleaner as claimed in claim 1, 2, 3 or 4, wherein each of the downstream cyclonic separators projects into the interior portion of the upstream cyclonic separator by a distance equal to about two thirds of its length.

* * * * *